United States Patent
Berberich et al.

(10) Patent No.: US 6,314,006 B1
(45) Date of Patent: Nov. 6, 2001

(54) DC/DC CONVERTER

(75) Inventors: Reinhold Berberich, Frankfurt; Andreas Fürbeth, Bad Soden, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/651,400

(22) Filed: Aug. 29, 2000

(30) Foreign Application Priority Data

Sep. 13, 1999 (DE) .............................. 199 43 575

(51) Int. Cl.⁷ .................................. H02M 3/337
(52) U.S. Cl. .............................. 363/25; 363/133
(58) Field of Search ................... 363/24, 25, 26, 363/131, 133

(56) References Cited

U.S. PATENT DOCUMENTS

| | | | |
|---|---|---|---|
| 5,218,522 | * | 6/1993 | Phelps et al. ...................... 363/124 |
| 5,436,825 | | 7/1995 | Wawra et al. . |
| 5,488,554 | * | 1/1996 | Green ...................................... 363/25 |
| 5,654,881 | * | 8/1997 | Albrecht et al. ....................... 363/25 |
| 5,659,463 | * | 8/1997 | Lee ......................................... 363/25 |
| 5,729,444 | * | 3/1998 | Perol ...................................... 363/25 |
| 5,822,201 | * | 10/1998 | Kijima ................................... 363/25 |
| 5,907,481 | * | 5/1999 | Svardsjo ................................ 363/25 |

FOREIGN PATENT DOCUMENTS 0771063    5/1997   (EP) .

* cited by examiner

*Primary Examiner*—Adolf Deneke Berhane
(74) *Attorney, Agent, or Firm*—Martin A. Farber

(57) ABSTRACT

In a DC/DC converter for producing a DC voltage from a supplied DC voltage with a reversible direction of action, a transformer operating in push-pull on the primary and secondary sides, the respective center taps are connected to a first terminal for the respective DC voltage, and further winding terminals are each connected via a semiconductor switch to a second terminal for the respective DC voltage, the semiconductor switches being controlled synchronously in pairs.

11 Claims, 3 Drawing Sheets

DC/DC CONVERTER

FIELD AND BACKGROUND OF THE INVENTION

When two DC voltage networks are connected, an energy flow may alternatively be needed in both directions. Thus, for example, in motor vehicles, in addition to the existing 14 V network, a 42 V network is introduced in order to be able to supply further loads with higher power demands. Depending on the operating state, it may be necessary to transfer energy from the 14 V network into the 42 V network or vice versa. For this purpose, in each case a DC/DC converter is intrinsically necessary, for which various circuit principles are known, for example the so-called parallel-fed push-pull converter.

These converters operate in push-pull operation on the primary and secondary side, and are distinguished by a good efficiency and simple driving of the semiconductor switches. On the secondary side, rectification is carried out in push-pull by means of two diodes which are connected to the ends of the windings and operate on an L/C filter element.

However, these known converters have the disadvantage of being usable in each case only in one direction of action (energy transfer direction), so that two of the known DC/DC converters are needed in order to connect the DC voltage networks.

SUMMARY OF THE INVENTION

The object of the present invention is to permit savings in both cost and weight in the connection of the two DC voltage networks, as compared with this known prior art.

According to the invention, this object is achieved by the respective center taps being connected to a first terminal for the respective DC voltage and further winding terminals each being connected via a semiconductor switch to a second terminal for the respective DC voltage, the semiconductor switches being controlled synchronously in pairs.

The invention has the advantage that, using a DC/DC converter, reversal of the direction of action can be carried out while using the same inductive components. In addition, in the invention, the same semiconductor switches can be operated as primary-side switches and as secondary-side rectifiers, depending on the direction of action.

In the DC/DC converter according to the invention, provision is preferably made for the center taps each to be connected via an inductor to the respective first DC voltage terminal, and for the second DC voltage terminals to be at ground potential and to be connected to the first terminals via a capacitor in each case. It is advantageous if DC voltages of the same polarity are present on the respective first terminal.

In the DC/DC converter according to the invention, the semiconductor switches are preferably field effect transistors, in particular so-called MOSFETs.

In principle, in the DC/DC converter according to the invention, the direction of action can be changed over automatically as a function of the magnitude of the DC voltages present. Without further measures, because of the transformer losses and the associated deviation of the effective transformation ratio as compared with the ratio of the number of turns, this presupposes a considerable deviation of the ratio of the DC voltages from the ratio of the number of turns. However, if the reversal of action is to take place even at small deviations, provision can be made, according to a development of the invention, for it to be possible to change the transformation ratio in order to change the direction of action.

A first advantageous refinement of this development consists in one of the windings in each case being lengthened symmetrically over the further winding terminals, the end terminals of the lengthened windings being connected via further semiconductor switches to the second terminal for the respective DC voltage, and the driving of the further semiconductor switches to be carried out alternatively with the driving of the semiconductor switches for the same DC voltage as a function of the direction of action. By selecting the turns between the further winding terminals and the end terminals with reference to the other number of turns, this DC/DC converter can be adapted very well to the respective conditions.

In this DC/DC converter, provision can advantageously be made for the further semiconductor switches to be controllable via a transformer and/or for the further semiconductor switches each to comprise a series circuit of two field effect transistors.

In a second advantageous refinement of the development, provision is made for the further winding terminals, preferably the ends, of one of the windings also to be connected via further semiconductor switches to the first terminal, the driving of the further semiconductor switches being carried out as a function of the direction of action and in antiphase with the driving of the semiconductor switch in each case connected to the same winding terminal, and for it to be possible for the center tap of the same winding to be connected via a third semiconductor switch to the first terminal as a function of the direction of action, the driving of the further semiconductor switches being suppressed when the third semiconductor switch is conductive. In this case, the further semiconductor switches and the third semiconductor switch can each comprise a series circuit of two field effect transistors.

A third advantageous refinement of the development is distinguished by a low outlay and consists in the further winding terminals, preferably the ends, of one of the windings also being connected via rectifier diodes to the first terminal, and for it to be possible for the center tap of the same winding to be connected via a third semiconductor switch to the first terminal as a function of the direction of action.

BRIEF DESCRIPTION OF THE DRAWINGS

The invention permits numerous embodiments. One of these is illustrated schematically in the drawings using a number of figures and is described below. In the drawings.

DETAILED DESCRIPTION OF THE PREFERRED EMBODIMENT

Identical parts are provided with identical reference symbols in the figures. A drive circuit is in each case illustrated as a block diagram. Details which are not needed to explain the invention have been left out for reasons of clarity, for example a protective circuit for the field effect transistors.

Figure 1:
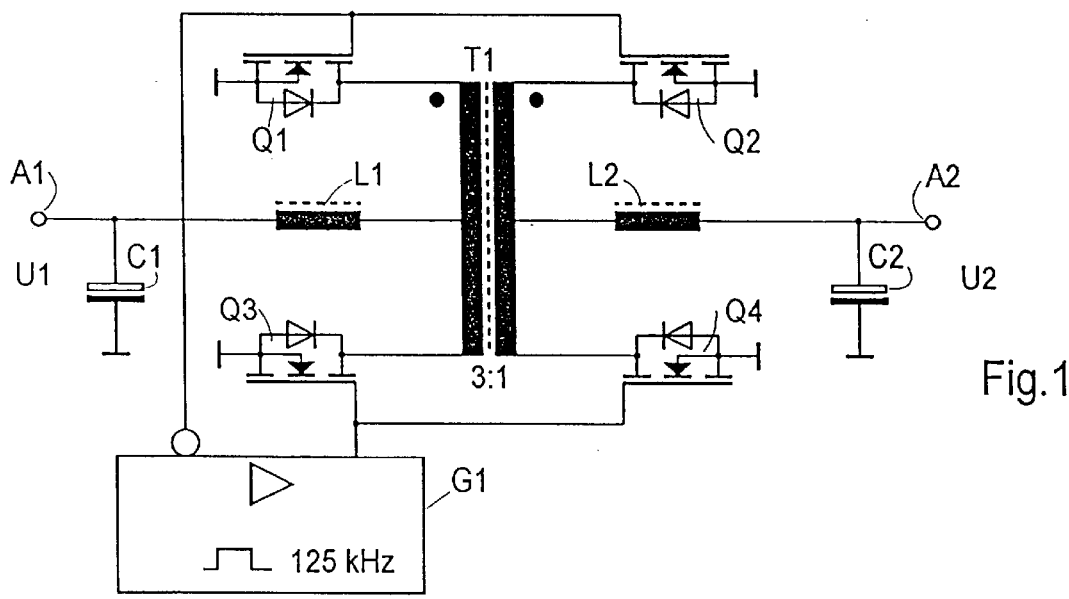
FIG. 1 shows a first exemplary embodiment.

While the circuit arrangement according to FIG. 1 is also symmetrical with respect to the two DC voltages U1, U2, in the exemplary embodiments according to FIGS. 2, 3, 4 and 5, circuit measures for changing over the transformation ratio are illustrated on the side of U1. However, it is left up to those skilled in the art as to the side on which these circuit measures are to be implemented.

In the exemplary embodiment according to FIG. 1, a transformer T1 with a turn ratio of 3:1 is provided. The ends of the windings are in each case connected via a field effect transistor Q1, Q2, Q3, Q4 to ground potential. The center taps are each connected via an inductor L1, L2 to terminals A1, A2 for the voltages U1 and U2. In the aforementioned on-board network for motor vehicles, the nominal values are 42 V for U1 and 14 V for U2. A control generator G1 generates square-wave pulses at a frequency of 125 kHz, which are fed to the control electrodes of the field effect transistors Q3 and Q4 and, in antiphase thereto, to the control electrodes of the field effect transistors Q1 and Q2. In this case—as in known DC/DC converters—pulse-width modulated control can be carried out.

When considering the functioning of the circuit arrangement, the following cases have to be distinguished:

$$U1 > 3 \cdot U2 \qquad 1.$$

This means that U1 is the input voltage, which passes via the inductor L1 to the center tap of the primary winding of the transformer T1. The field effect transistors Q1 and Q3 are alternately turned on by the generator G1 and switch the current flow alternately through the upper and the lower half of the left-hand winding, which in this operating case serves as a primary winding, to ground. As a result, an alternating magnetic field is generated in the transformer T1, and induces a corresponding current flow in the secondary winding. The field effect transistors Q2 and Q4 are in each case driven together with the field effect transistors Q1 and Q3, and thus act as a synchronous rectifier. The resulting current half-waves alternately charge a capacitor C2 to the output voltage U2 via Q2 and L2 and Q4 and L2, respectively, the inductor L2 and the capacitor C2 acting as a filter element. U2 therefore follows the input voltage U1 approximately in the ratio 3:1.

$$U1 < 3 \cdot U2 \qquad 2$$

In this case, the direction of action is reversed, the field effect transistors being driven exactly as in the first case. In this case, the field effect transistors Q2 and Q4 alternately switch the current from the terminal A2 to ground, while the field effect transistors Q1 and Q3 operate as a synchronous rectifier. The voltage U1 follows the voltage U2 approximately in the ratio 1:3.

$$U1 \approx 3 \cdot U2 \qquad 3.$$

The circuit arrangement operates in the balanced state as a current balance. The resulting current always flows from the side of the higher voltage in the direction of the lower voltage, a balancing operation taking place as a result. The current direction and hence the direction of action of the circuit as an upward or downward converter is automatically reversed.

The resulting transformation ratio U1:U2 depends on the losses in the circuit and is therefore not mutually reciprocal in the two directions of action. If the generation of defined output voltages in both directions is necessary, this can be achieved with pulse-width modulation of the control generator. However, a certain control reserve is needed for regulation; this means that the maximum output voltage that can be generated must be higher than the voltage to be regulated in each case. This can be implemented by using different transformation ratios of the transformer. Thus, for example, in downward operation, a turn ratio of 2:1 is considered, and in upward operation a turn ratio of 1:4. In the case of this operation of the DC/DC converter according to the invention, a possibility of switching over the transformation ratio of the transformer is therefore necessary.

Figure 2:
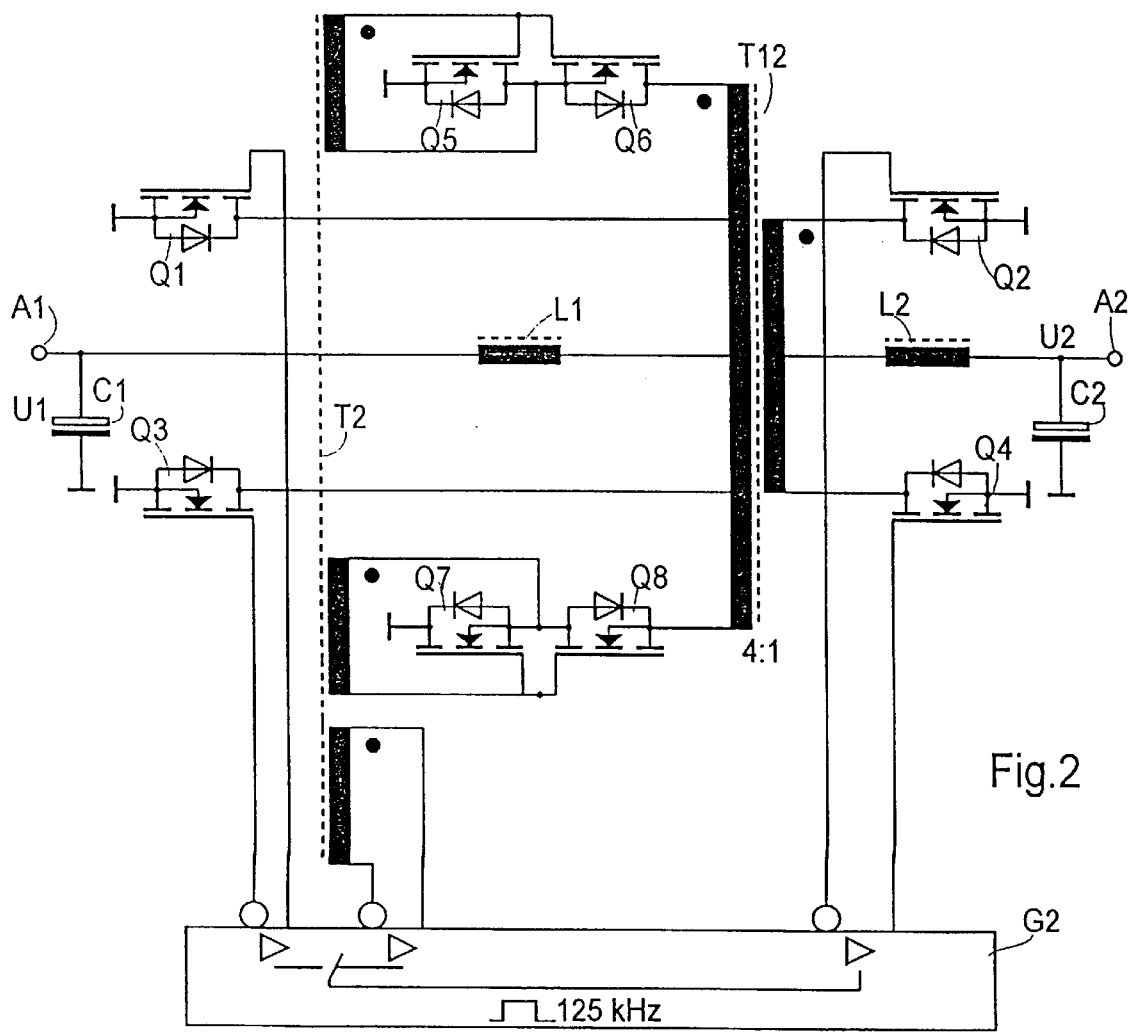
FIG. 2 shows a second exemplary embodiment.

This is made possible with the exemplary embodiment according to FIG. 2, in the manner that one winding—the left-hand winding in FIG. 2—of the transformer T12 is provided with further turns and end terminals, which can be connected via further semiconductor switches to ground potential. These further semiconductor switches are each formed from a series circuit of two field effect transistors Q5, Q6 and Q7, Q8. In the exemplary embodiment, the number of turns of the entire left-hand winding is four times that of the right-hand winding, while the number of turns between the taps connected to the field effect transistors Q1 and Q3 is twice the number of turns of the right-hand winding.

For a conversion with a direction of action from left to right—also referred to as downward conversion below, because of the abovementioned numerical example—the lower transformation ratio is needed. Accordingly, the field effect transistors Q1 and Q3 are clocked, as in the circuit arrangement of FIG. 1. Since very high voltages are produced by the back-induction at the non-driven ends of the primary winding of the transformer T12, in the circuit arrangement according to FIG. 2 it is ensured that the semiconductor switches connected here turn off reliably. For this reason, these semiconductor switches each comprise two field effect transistors Q5, Q6 and Q7, Q8 connected in series in opposite directions, which are driven, with DC decoupling, via a transformer T2.

For the upward conversion, the complete transformation ratio 1:4 is needed. The field effect transistors Q2 and Q4 are therefore clocked as inverters, and Q5, Q6, Q7 and Q8 are operated as synchronous rectifiers. The field effect transistors Q1 and Q3 are then nonconductive. An appropriate changeover is indicated in the illustration of the control generator G2 in FIG. 2.

This changeover can be made in the control generator G2 as a function of the result of a differential measurement of the voltages U1 and U2 weighted with the transformation ratio. However, the changeover is also possible on the basis of other operating variables, it being possible for intelligent control devices to be used. For the more precise control of the effective transformation ratio, in order to obtain regulated voltages in both directions of action, pulse-width modulation can likewise be applied in the control generator G2.

Figure 3:
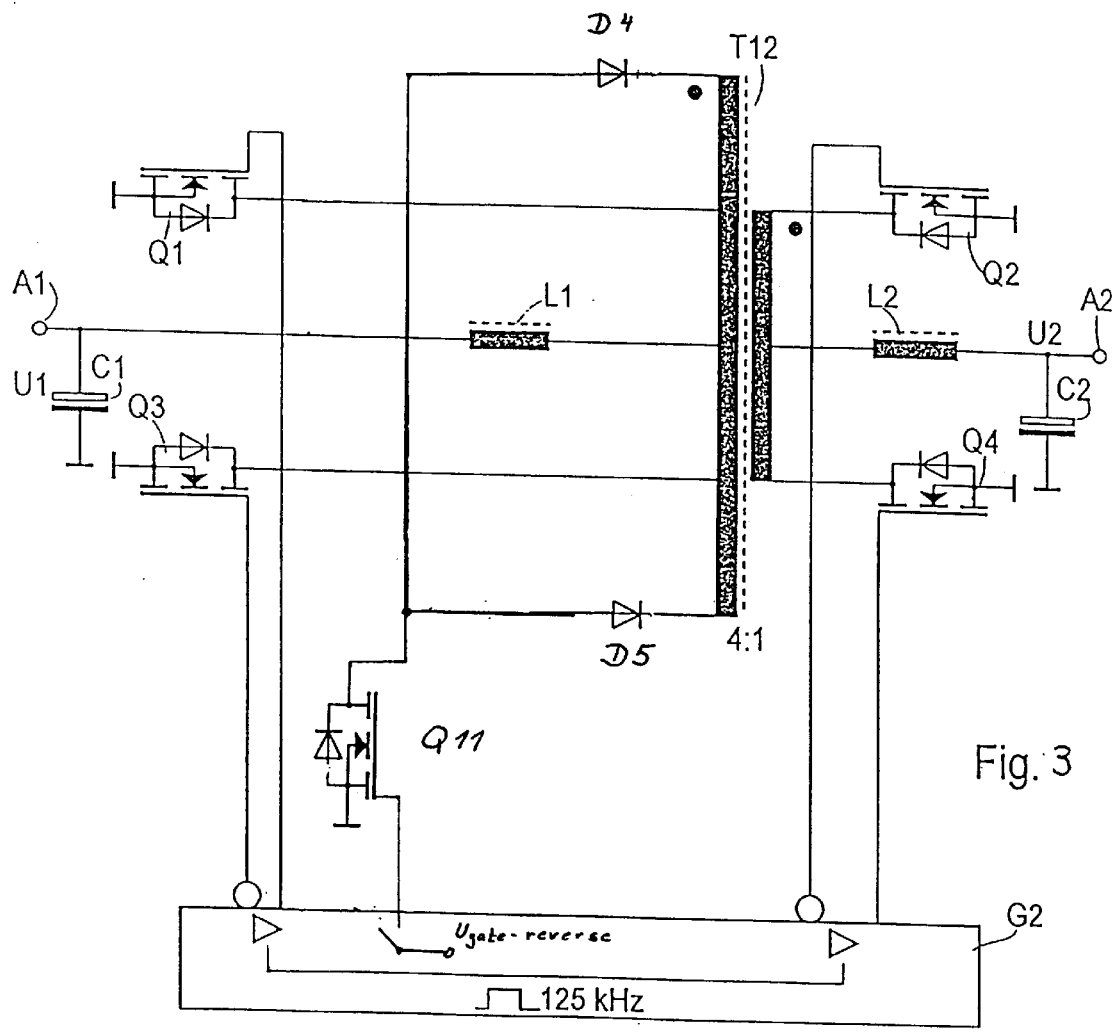
FIG. 3 shows a third exemplary embodiment.

A simpler and more convenient design is illustrated in FIG. 3. In this case, the field effect transistors Q6 and Q8 are replaced by diode D4 and D5 respectively. The anode terminals of the diodes D4 and D5 are connected to a drain terminal of a field effect transistor Q11, which replaces the field effect transistors Q5 and Q7 of FIG. 2. The source terminal of field effect transistor Q11 is connected to ground, while the gate is connected to $U_{gate-reverse}$, which is provided by the control generator G2.

Figure 4:
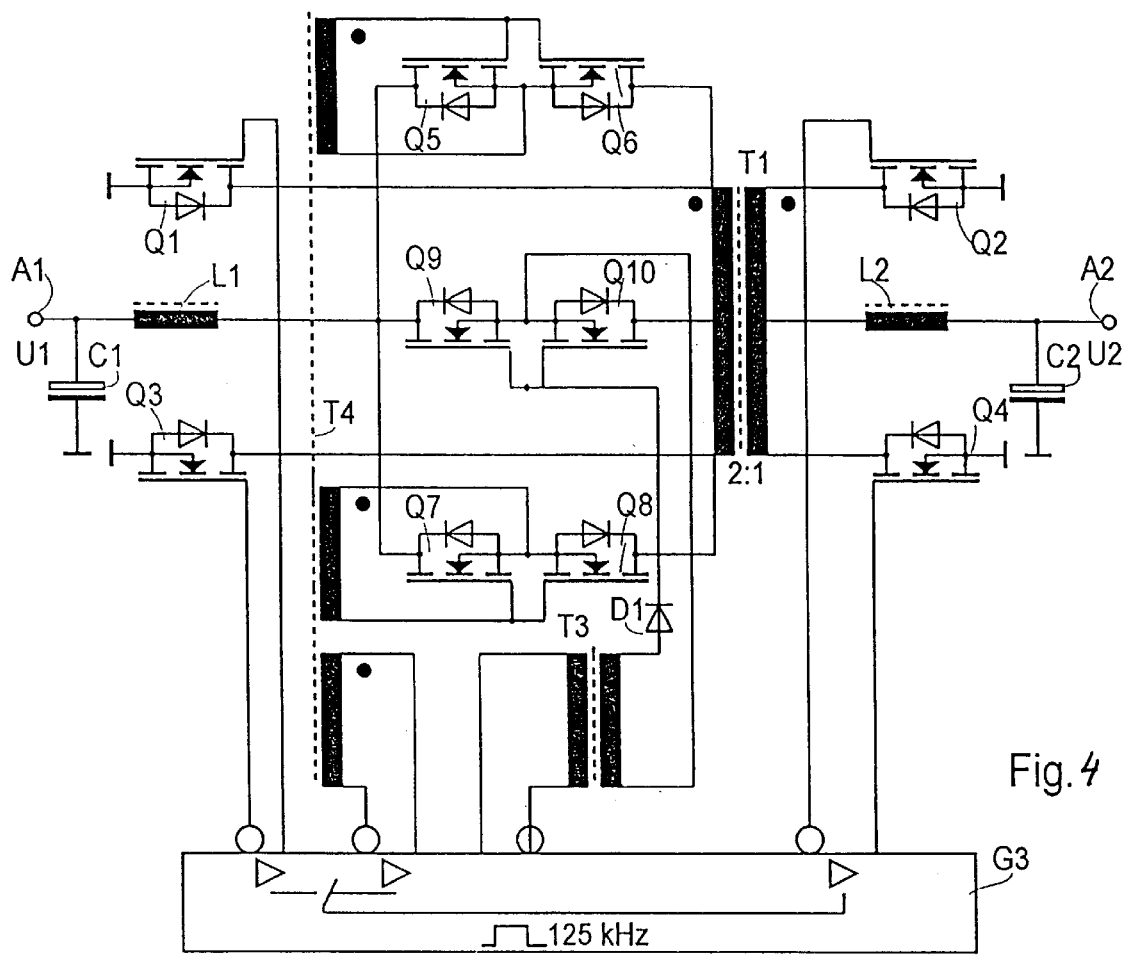
FIG. 4 shows a fourth exemplary embodiment.

In the exemplary embodiment of FIG. 4, the transformation ratio is switched over by the primary winding of the transformer being operated with the center tap only in the downward direction. For this purpose, a third semiconductor switch is inserted into the feed line to the center tap, again comprising two field effect transistors Q9 and Q10. These are likewise driven in a potential-free manner via a transformer T3. Since here a non-pulsating, static drive is required, one diode acts together with capacitors (not illustrated) in the control circuit of the field effect transistors Q9, Q10, so that when pulses are fed via the transformer T3 to the control electrodes of the field effect transistors Q9 and Q10, a DC voltage is present, as long as the center tap is connected to the inductor L1.

For the purpose of synchronous rectification during conversion in the upward direction, in addition to the field effect transistors Q1 and Q3, further field effect transistors QS to Q8 are provided, which, connected in series in pairs, alternately connect the ends of the left-hand winding to the inductor L1 and thus form a synchronous bridge rectifier. As a result, during synchronous rectification, the entire number of turns of the left-hand winding is effective, which results in a transformation ratio of 1:4. DC isolation with the aid of a transformer T4 is also necessary for driving the field effect transistors Q5 to Q8.

In the exemplary embodiment of FIG. 4, the control generator G3 is designed in such a way that, depending on the direction of action, either the field effect transistors Q5 to Q8 are driven into the conductive state, or the field effect transistors Q9 and Q10 are driven into the conductive state.

Figure 5:
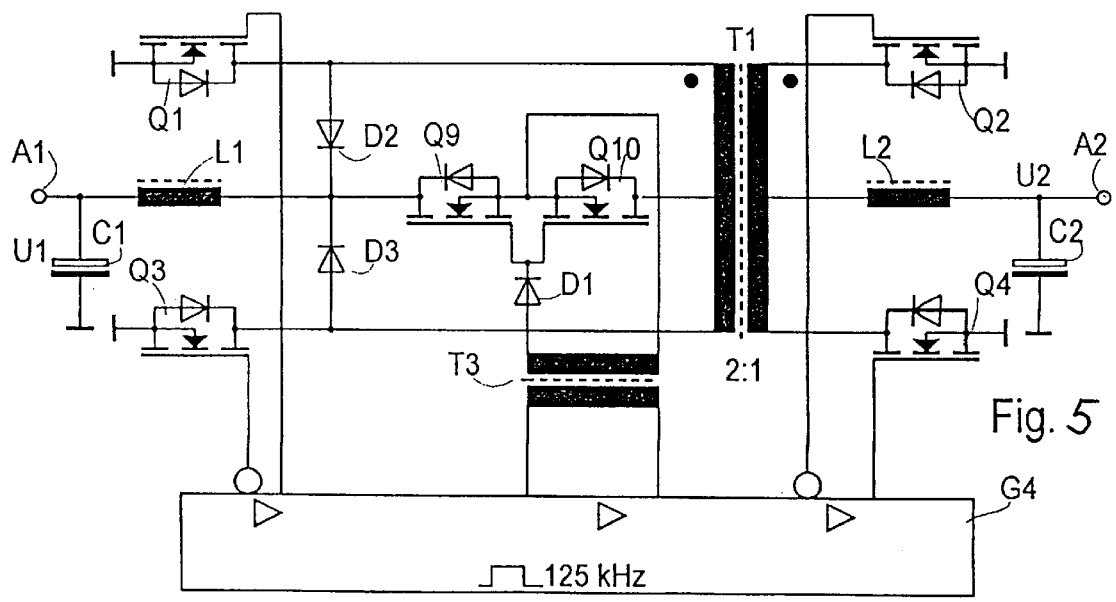
FIG. 5 shows a fifth exemplary embodiment.

FIG. 5 shows a circuit arrangement which is simplified by comparison with the circuit arrangement of FIG. 4, rectifier diodes D2 and D3 being provided in addition to the field effect transistors Q1 and Q3, for the purpose of rectification in the downward direction. As a result, the control generator G4 is also simplified by comparison with the control generator G3 (FIG. 4).

The DC/DC converter according to the invention may advantageously be used as a so-called power management module for a 42 V/14 V motor vehicle on-board network having the following functions 1. conversion of the 42 V generator voltage into the 14 V network voltage for charging the 14 V vehicle battery and for supplying the 14 V loads, 2. converting the 14 V battery voltage into the 42 V network voltage for charging the 42 V starter batteries, for supplying the 42 V loads when the vehicle is at a standstill and for emergency supply to the 42 V network in the event of failure of the generator and of the 42 V battery, 3. with automatic changeover of the direction of action, depending on the operating state.

A further application can exist in a decentralized emergency power supply for personal computers, medical or safety equipment, with the following functions being fulfilled 1. conversion of the rectified and filtered 230 V mains voltage into a lower DC voltage for charging the buffer batteries, 2. converting the voltage of the buffer batteries into a square-wave or trapezoidal 230 V mains voltage for supplying the equipment to be protected, 3. automatic changeover of the direction of action, depending on the operating state.

What is claimed is:

1. A DC/DC converter for producing a DC voltage from a supplied DC voltage with a reversible direction of action, a transformer operating in push-pull on primary and secondary sides, wherein respective center taps are connected to a first terminal (A1, A2) for the respective DC voltage and further winding terminals are each connected via a semiconductor switch (Q1 to Q4) to a second terminal for the respective DC voltage, the semiconductor switches (Q1 to Q4) being controlled synchronously in pairs, wherein a transformation ratio can be changed over in order to change over the direction of action, wherein one of the windings is in each case lengthened symmetrically over the further winding terminals, wherein end terminals f the lengthened windings are connected via further semiconductor switches (Q5 to Q8) to the second terminal for the respective DC voltage, and wherein driving of the further semiconductor switches (Q5 to Q8) is carried out alternatively with driving of the semiconductor switches (Q1, Q3) for the same DC voltage as a function of the direction of action.

2. The DC/DC converter as claimed in claim 1, wherein the further semiconductor switches (Q5 to Q8) are controllable via a transformer (T2).

3. The DC/DC converter as claimed in claim 1, wherein the further semiconductors each comprises a series circuit of two field effect transistors (Q5, Q6; Q7, Q8).

4. The DC/DC converter as claimed in claim 1, wherein the further semiconductor switches are formed of a combination of diodes and transistors, each end terminal of the winding being connected to a diode (D4, D5) in each case.

5. The DC/DC converter as claimed in claim 4, wherein anodes of the diodes (D4, D5) are connected to a drain terminal of a transistor (Q11), a gate of which is switched by a control generator (G2).

6. The DC/DC converter as claimed in claim 1, wherein center taps are each connected via an inductor (L1, L2) to the first terminal (A1, A2) for respective DC voltage, and wherein second DC voltage terminals are at ground potential and are connected to first terminals (A1, A2) via a capacitor (C1, C2).

7. The DC/DC converter as claimed in claim 1, wherein DC voltages of same polarity are present on the respective first terminal (A1, A2).

8. The DC/DC converter as claimed in claim 1, wherein at least one of said first semiconductor switches (Q1 to Q4) is a field effect transistors.

9. A DC/DC converter for producing a DC voltage from a supplied DC voltage with a reversible direction of action, a transformer operating in push-pull on primary and secondary sides, wherein respective center taps are connected to a first terminal (A1, A2) for the respective DC voltage and further winding terminals are each connected via a first semiconductor switch (Q1 to Q4) to a second terminal for the respective DC voltage, the first semiconductor switches (Q1 to Q4) being controlled synchronously in pairs, wherein a transformation ratio can be changed over in order to change over the direction of action, wherein the further winding terminals, preferably ends, of one of the windings are also connected via second semiconductor switches (Q5 to Q8) to the first terminal (A1), driving of the second semiconductor switches (Q5 to Q8) being carried out as a function of the direction of action and in antiphase with driving of the first semiconductor switch (Q1, Q3) in each case connected to the same winding terminal, and wherein the center tap of the same winding is connectable via a third semiconductor switch (Q9, Q10) to the first terminal as a function of the direction of action, driving of the second semiconductor switches (Q5 to Q8) being suppressed when the third semiconductor switch (Q9, Q10) is conductive.

10. The DC/DC converter as claimed in claim 9, wherein the second semiconductor switches and the third semiconductor switch each comprises a series circuit of two field effect transistors (Q5, Q6; Q7, Q8; Q9, Q10).

11. A DC/DC converter for producing a DC voltage from a supplied DC voltage with a reversible direction of action, a transformer operating in push-pull on primary and secondary sides, wherein respective center taps are connected to a first terminal (A1, A2) for the respective DC voltage and further winding terminals are each connected via a first semiconductor switch (Q1 to Q4) to a second terminal for the respective DC voltage, the first semiconductor switches (Q1 to Q4) being controlled synchronously in pairs, wherein a transformation ratio can be changed over in order to change over the direction of action, wherein the further winding terminals, preferably ends, of one of the windings are also connected via rectifier diodes (D2, D3) to the first terminal (A1), and wherein the center tap of the same winding is connectable via a second semiconductor switch (Q9, Q10) to the first terminal (A1), depending on the direction of action.

* * * * *